US011133500B2

(12) United States Patent
Jörissen et al.

(10) Patent No.: US 11,133,500 B2
(45) Date of Patent: Sep. 28, 2021

(54) REVERSIBLE MANGANESE DIOXIDE ELECTRODE, METHOD FOR THE PRODUCTION THEREOF, THE USE THEREOF, AND RECHARGEABLE ALKALINE-MANGANESE BATTERY CONTAINING SAID ELECTRODE

(71) Applicant: ZENTRUM FÜR SONNENENERGIE- UND WASSERSTOFF-FORSCHUNG BADEN- WÜRTTEMBERG GEMEINNUTZIGE STIF-TUNG, Stuttgart (DE)

(72) Inventors: Ludwig Jörissen, Neu-Ulm (DE); Jerry Bamfo Asante, Ulm (DE); Olaf Böse, Neu-Ulm (DE)

(73) Assignee: ZENTRUM FÜR SONNENENERGIE- UND WASSERSTOFF-FORSCHUNG BADEN- WÜRTTEMBERG GEMEINNÜTZIGE STIFTUNG, Stuttgart (DE)

( * ) Notice: Subject to any disclaimer, the term of this patent is extended or adjusted under 35 U.S.C. 154(b) by 0 days.

(21) Appl. No.: 16/770,463

(22) PCT Filed: Nov. 21, 2019

(86) PCT No.: PCT/EP2019/082056
§ 371 (c)(1),
(2) Date: Jun. 5, 2020

(87) PCT Pub. No.: WO2020/074749
PCT Pub. Date: Apr. 16, 2020

(65) Prior Publication Data
US 2020/0373571 A1 Nov. 26, 2020

(30) Foreign Application Priority Data

Dec. 6, 2018 (DE) .................. 10 2018 131 168.0

(51) Int. Cl.
*H01M 4/50* (2010.01)
*H01M 4/36* (2006.01)
(Continued)

(52) U.S. Cl.
CPC ......... *H01M 4/502* (2013.01); *H01M 4/0452* (2013.01); *H01M 4/29* (2013.01);
(Continued)

(58) Field of Classification Search
CPC ...... H01M 4/502; H01M 4/0452; H01M 4/29; H01M 4/366; H01M 10/26; H01M 10/44;
(Continued)

(56) References Cited

U.S. PATENT DOCUMENTS 3,615,833 A * 10/1971 Jost .................. H01M 4/32
429/206
5,508,121 A 4/1996 Sawa
(Continued)

FOREIGN PATENT DOCUMENTS

CN     108291319 A    7/2018
DE     196 41 135 C1  1/1998
(Continued)

OTHER PUBLICATIONS

International Search Report dated Jan. 24, 2020 issued in corresponding International Application No. PCT/EP2019/082056.

*Primary Examiner* — Lisa S Park
(74) *Attorney, Agent, or Firm* — Nath, Goldberg & Meyer; Tanya E. Harkins (57) ABSTRACT

The invention relates to a reversible manganese dioxide electrode, comprising an electrically conductive carrier
(Continued)

material having a nickel surface, a nickel layer made of spherical nickel particles adhering to each other and having an inner pore structure applied to the carrier material, and a manganese dioxide layer applied to the nickel particles, wherein the manganese dioxide layer is also present in the inner pore structure of the nickel particle.

The invention also relates to a method for producing such a manganese dioxide electrode, the use thereof in rechargeable alkaline-manganese batteries, and a rechargeable alkaline-manganese battery containing a manganese dioxide electrode according to the invention.

6 Claims, 8 Drawing Sheets

(51) Int. Cl.
*H01M 10/44* (2006.01)
*H01M 10/26* (2006.01)
*H01M 4/04* (2006.01)
*H01M 4/29* (2006.01)

(52) U.S. Cl.
CPC ........... *H01M 4/366* (2013.01); *H01M 10/26* (2013.01); *H01M 10/44* (2013.01)

(58) Field of Classification Search
CPC .. H01M 4/661; H01M 2004/029; H01M 4/26; H01M 4/50; H01M 10/30; H01M 4/24; H01M 8/0232; H01M 8/0245; H01M 8/0247; Y02E 60/10
See application file for complete search history.

(56) References Cited

U.S. PATENT DOCUMENTS 5,523,182 A * 6/1996 Ovshinsky ............ H01M 4/624
429/223
6,153,334 A * 11/2000 Sakamoto .............. C01G 53/00
429/223

FOREIGN PATENT DOCUMENTS

| | | |
|---|---|---|
| DE | 197 49 763 A1 | 5/1999 |
| EP | 1 699 099 A1 | 9/2006 |
| JP | H10-172551 A | 6/1998 |
| JP | 2005-243602 A | 9/2005 |
| KR | 10-2015-0083898 A | 7/2015 |
| WO | 2017/085173 A1 | 5/2017 |

* cited by examiner

REVERSIBLE MANGANESE DIOXIDE ELECTRODE, METHOD FOR THE PRODUCTION THEREOF, THE USE THEREOF, AND RECHARGEABLE ALKALINE-MANGANESE BATTERY CONTAINING SAID ELECTRODE

This is a National Phase Application filed under 35 U.S.C. 371 as a national stage of PCT/EP2019/082056, filed Nov. 21, 2019, an application claiming the benefit of German Application No. 10 2018 131 168.0, filed Dec. 6, 2018, the content of each of which is hereby incorporated by reference in its entirety.

FIELD OF THE INVENTION

The invention relates to a reversible manganese dioxide electrode made of an electrically conductive carrier material having a nickel surface, a nickel layer made of spherical nickel particles having an internal pore structure applied to the carrier material and a manganese dioxide layer applied to the nickel particles, a method for the production of such a manganese dioxide electrode, the use thereof in rechargeable alkaline battery systems, in particular alkaline-manganese batteries, and a rechargeable alkaline-manganese battery containing such a reversible manganese dioxide electrode, in particular an alkaline-manganese battery also designated as alkali-mangenese battery.

TECHNICAL BACKGROUND AND PRIOR ART

The alkaline-manganese battery or the alkaline-manganese cell is an important electrochemical energy store from the family of zinc manganese dioxide cells. The alkaline-manganese cell is one of the primary elements, i.e. the non-rechargeable batteries, although it is generally rechargeable to an extent. Versions intended for recharging are referred to as "RAM cells" (Rechargeable Alkaline Manganese), which count as secondary elements (accumulators).

In the alkaline-manganese cell, also referred to as zinc manganese oxide cell, manganese dioxide is used for the positive electrode, wherein an aqueous solution of potassium hydroxide is usually used as the alkaline electrolyte. The cathode (positive electrode) is on the outside and is a metal cup coated on the inside with manganese dioxide. The anode (negative electrode) in the middle of the cell usually consists of zinc powder.

The cyclization of manganese dioxide electrodes was limited under these conditions to a few cycles with poor performance. The interest in manganese dioxide as a positive electrode material for alkaline electrolytes is due to the high specific capacity, the low price, and the low toxicity thereof. However, the low cyclability due to the high irreversible losses during charging has hitherto prevented the use of manganese dioxide as a positive electrode material in rechargeable batteries having alkaline electrolytes.

RAM cells can deliver approximately 10-20 full cycles (at 100% depth of discharge) or approximately 200 cycles at a low depth of discharge of 10-20%. After 10 full cycles (100% depth of discharge) using a discharge current rate of 0.08 C, only 60% of the initial capacity is available. In addition, they can only be used for very low discharge current rates between 0.03 and 0.6 C. RAM cells are therefore only suitable for low-current applications, such as clocks or remote controls. They are not suitable for high-current applications such as digital cameras, cordless tools, or as drive batteries in model vehicles and can be damaged in the process. Furthermore, an increase in the discharge current rate from 0.03 C to 0.5 C already halves the available capacity. RAM cells must not be over-discharged in order not to lose their recharge ability. If RAM cells are discharged up to a final discharge voltage of 1.42 V per cell, the achievable number of cycles is a few 100s. With a discharge of up to 1.32 V, the number of cycles is reduced to a few 10s. In the event of a further discharge, RAM cells can no longer be charged or can only be charged with a significantly reduced capacity.

OBJECT OF THE INVENTION

The invention has for its object to provide a reversible manganese dioxide electrode and a method for its production, while avoiding the disadvantages of the prior art, which can be used as a working electrode in rechargeable alkaline battery systems, in particular alkaline-manganese cells. Likewise, a rechargeable alkaline-manganese battery, in particular an alkaline-manganese battery, is to be provided, which allows high discharge current rates and has good cycle stability without suffering significant capacity losses.

SUMMARY OF THE INVENTION

The aforementioned objects are achieved according to the invention by a reversible manganese dioxide electrode according to claim 1, a process for the production thereof according to claim 7, the use thereof according to claim 13, and a rechargeable alkaline-manganese battery according to claim 14.

Preferred or particularly expedient embodiments of the subject matter of the application are specified in the subclaims.

The invention thus relates to a reversible manganese dioxide electrode, comprising an electrically conductive carrier material having a nickel surface, a nickel layer made of spherical nickel particles adhering to each other and having an inner pore structure applied to the carrier material and a manganese dioxide layer applied to the nickel particles, wherein the manganese dioxide layer is also present in the inner pore structure of the nickel particle.

The invention also relates to a method for producing such a reversible manganese dioxide electrode, comprising the following steps:
  a) Providing an electrode structure made of an electrically conductive carrier material having a nickel surface and a nickel layer made of spherical, porous nickel particles adhering to each other and having an inner pore structure applied to the carrier material,
  b) Depositing a manganese(II)-hydroxide layer onto the nickel particles of the nickel layer from a manganese (II)-salt solution,
  c) Oxidizing the manganese(II)-hydroxide layer to a manganese dioxide layer.

The invention also relates to the use of the reversible manganese dioxide electrode according to the invention as a working electrode in rechargeable alkaline battery systems, in particular alkaline-manganese batteries or secondary alkaline-manganese cells.

The invention finally relates to a rechargeable alkaline-manganese battery, in particular an alkaline-manganese battery or a secondary alkaline-manganese cell, containing a reversible manganese dioxide electrode according to the invention as the working electrode.

DETAILED DESCRIPTION OF THE INVENTION

The manganese dioxide electrode according to the invention, which is intended in particular for alkaline aqueous electrolytes, is characterized in that when used as a working electrode in an alkali-manganese cell with an alkaline electrolyte, discharge current rates of up to 150 C are possible, wherein the cell itself has no discernible loss of capacity after 100 cycles.

The electrodes according to the invention show an initial formation reaction, in which approximately 30 cycles are required to develop the full capacity. The manganese dioxide electrodes according to the invention are therefore suitable as positive electrodes for use in rechargeable alkaline battery systems, in particular alkaline-manganese batteries.

The manganese dioxide electrode according to the invention is constructed in such a way that a nickel layer made of spherical nickel particles adhering to one another and having an inner pore structure is provided on an electrically conductive carrier material having a nickel surface, preferably a nickel plate. A manganese dioxide layer is then applied to the nickel particles of the nickel layer, wherein the manganese dioxide layer is also present in the inner pore structure of the nickel particles. The manganese dioxide layer can partially or completely fill the inner pore structure, so that the inner surface of the pores is partially or completely covered with manganese dioxide. While the nickel particles of the nickel layer have an inner pore structure, the nickel layer also has an outer pore structure, which is defined by the voids between the individual nickel particles. This outer pore structure can also be partially covered with manganese dioxide, in particular in surface areas which lie opposite the carrier material.

The electrically conductive carrier material having a nickel surface can be not only a nickel sheet, but also a nickel foil or nickel-coated carrier material, including nickel-coated metal or plastic foils, such as steel foils, or nickel-coated non-woven or fabric textiles. Such electrically conductive fabrics based on nickel-coated nonwoven and fabric textiles are commercially available and consist, for example, of polyester, which are made electrically conductive by a nickel coating. This means that these fabrics have electrical properties that are just as good as those of metal having great material flexibility and light weight.

According to the invention, it has been shown that by using such a nanostructured nickel electrode as the basic electrode structure and applying a manganese dioxide layer to such a nanostructured nickel electrode, reversible manganese dioxide electrodes having the aforementioned advantageous properties can be obtained. Nanostructured nickel electrodes are understood to mean nickel electrodes which have a nickel layer composed of spherical, porous nickel particles adhering to one another, wherein the nickel particles have an inner pore structure with a high inner surface. The pores have a diameter of a few 100 nm, preferably up to 100 nm.

Such nickel electrodes and methods for their production are described in WO 2017/085173 A1. The method for producing such nickel electrodes comprises the following steps:

a) providing spherical nickel hydroxide particles,
b) partially reducing the spherical nickel hydroxide particles in a reducing atmosphere at elevated temperatures in order to achieve partially reduced, spherical Ni/NiO particles,
c) producing a paste from the Ni/NiO particles obtained and an organic and/or inorganic binder and, if appropriate, further auxiliaries,
d) applying the paste as a coat on one or both sides of an electrically conductive carrier material having a nickel surface, in particular a nickel sheet, and
e) tempering the coated carrier material in a reducing atmosphere at elevated temperatures.

In the manganese dioxide electrode according to the invention, the nickel layer preferably has a thickness in the range from 10-1000 µm, more preferably 20-500 µm, even more preferably 50-200 µm, and particularly preferably about 100 µm, before the manganese dioxide layer is applied.

The spherical nickel particles of the nickel layer preferably have an average particle size of 0.1-25 µm, more preferably of 1-10 µm, even more preferably of 2-6 µm, and particularly preferably of 3-4 µm.

In the method for producing a manganese dioxide electrode according to the invention, a nickel electrode as described above is initially provided as the basic electrode structure. A manganese(II)-hydroxide layer from a manganese(II)-salt solution is then deposited on the nickel particles of the nickel layer. The manganese(II)-hydroxide layer is preferably deposited electrochemically in a manner known per se, wherein a manganese nitrate solution is preferably used as the manganese(II)-salt solution. For example, potentiostatic deposition takes place against an Ag/AgCl reference electrode from an aqueous manganese nitrate solution. The amount of electricity required for the deposition can be calculated according to Faraday's law in a manner known per se. This process reduces the nitrate ion to nitrite ion, forming hydroxide ions. The hydroxide ions formed precipitate the manganese(II)-hydroxide on the nickel particles.

A manganese dioxide layer can of course also be deposited from other manganese compounds, for example from potassium permanganate.

In a further step, the manganese(II)-hydroxide layer is then oxidized to a manganese dioxide layer. Known oxidizing agents can be used here, such as selected from the group consisting of hydrogen peroxide, potassium peroxodisulfate, potassium permanganate, sodium hypochlorite, dichloroxide, oxygen, such as atmospheric oxygen and ozone. In the process according to the invention, the oxidation is preferably carried out by means of an alkaline solution of hydrogen peroxide, particularly preferably an aqueous solution of potassium hydroxide and hydrogen peroxide. A 1:1 solution of 0.1 M KOH and 0.1 M $H_2O_2$ is particularly suitable, for example.

The manganese dioxide layer of the manganese dioxide electrode according to the invention preferably has a thickness in the range from 1 to 50 µm, more preferably from 2 to 30 µm, even more preferably from 5 to 20 µm, and particularly preferably from 5 to 10 µm. These thicknesses refer to the so-called equivalent layer thickness, which is to be understood as the layer thickness that would result on a completely planar carrier material. In the case of electrochemical deposition of the manganese(II)-hydroxide layer as an intermediate stage, a corresponding amount of manganese(II)-hydroxide per 1 $cm^2$ of electrode area is required to achieve a desired equivalent layer thickness of manganese dioxide. The amount of electricity required for the deposition of the corresponding basis weight of manganese(II)-hydroxide can be calculated in a manner known per se according to Faraday's law. For example, loading the electrode carrier material with 2.54 mg/$cm^2$ $Mn(OH)_2$ arithmetically results in an equivalent layer thickness of rounded 5

μm $MnO_2$. A loading of the electrode carrier material with 5.08 mg/cm² $Mn(OH)_2$ corresponds to an equivalent layer thickness of rounded 10 μm $MnO_2$.

PREFERRED EMBODIMENTS AND EXEMPLARY EMBODIMENTS

Example 1 (Production of a Manganese Dioxide Electrode Having a $MnO_2$ Layer Thickness of Approximately 5 μm)

In the first step, an approximately 5 μm $Mn(OH)_2$ layer is electrochemically deposited on nanostructured nickel electrodes by potentiostatic deposition at −1.1 V against the Ag/AgCl reference electrode from a freshly prepared, aqueous 1M $Mn(NO_3)_2$ solution. The amount of current for the deposition of 2.54 mg $Mn(OH)_2$ per 1 cm² electrode area results according to Faraday's law in 1.567 mAh. After the $Mn(OH)_2$ layer has been produced, the electrode is rinsed thoroughly with deionized water.

In the second step, the electrode thus produced is oxidized to $MnO_2$ with a 1:1 solution of 0.1 M KOH and 0.1 $MH_2O_2$ for 10 to 12 hours at room temperature. Mathematically, this results in 2.48 mg $MnO_2$ per 1 cm². With a density of 5.03 g/cm³ for $MnO_2$, this results in an equivalent layer thickness of 4.93 μm $MnO_2$ and approximately 5 μm rounded. After the $MnO_2$ layer has been produced, the electrode is rinsed thoroughly with deionized water and then dried at 40° C. for 5 hours.

Example 2 (Production of a Manganese Dioxide Electrode with $MnO_2$ Layer Thickness of about 10 μm)

In the first step, an approximately 10 μm $Mn(OH)_2$ layer is electrochemically deposited on nanostructured nickel electrodes by potentiostatic deposition at −1.1 V against the Ag/AgCl reference electrode from a freshly prepared, aqueous 1M $Mn(NO_3)_2$ solution. The amount of current for the deposition of 5.08 mg $Mn(OH)_2$ per 1 cm² electrode area results according to Faraday's law in 3.134 mAh. After the $Mn(OH)_2$ layer has been produced, the electrode is rinsed thoroughly with deionized water.

In the second step, the electrode thus produced is oxidized to $MnO_2$ with a 1:1 solution of 0.1 M KOH and 0.1 $MH_2O_2$ for 10 to 12 hours at room temperature. Mathematically, this results in 4.96 mg $MnO_2$ per 1 cm². This results in an equivalent layer thickness of 9.86 μm $MnO_2$ and approximately 10 μm rounded. After the $MnO_2$ layer has been produced, the electrode is rinsed thoroughly with deionized water and then dried at 40° C. for 5 hours.

Example 3 (Cyclization and Discharge of the Electrodes According to the Invention)

Three samples each of the electrodes produced in Example 1 (layer thickness approximately 5 μm) and Example 2 (layer thickness approximately 10 μm) were discharged with different current densities up to 400 mA/cm². The discharge diagrams obtained in this way are shown in FIGS. 7 and 8.

It can be seen that the electrodes produced undergo an initial formation reaction of approximately 30 cycles before they reach their full capacity.

Figure 1:
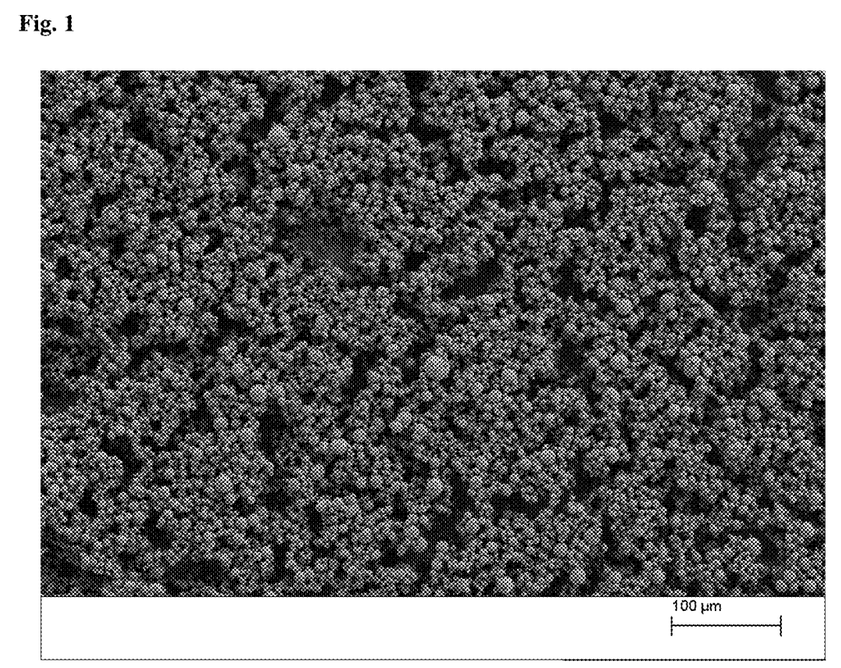
FIG. 1 shows a SEM image of the surface of a nickel electrode used as the basic electrode structure for producing a manganese dioxide electrode according to the invention at a magnification of five hundred times.
Figure 2:
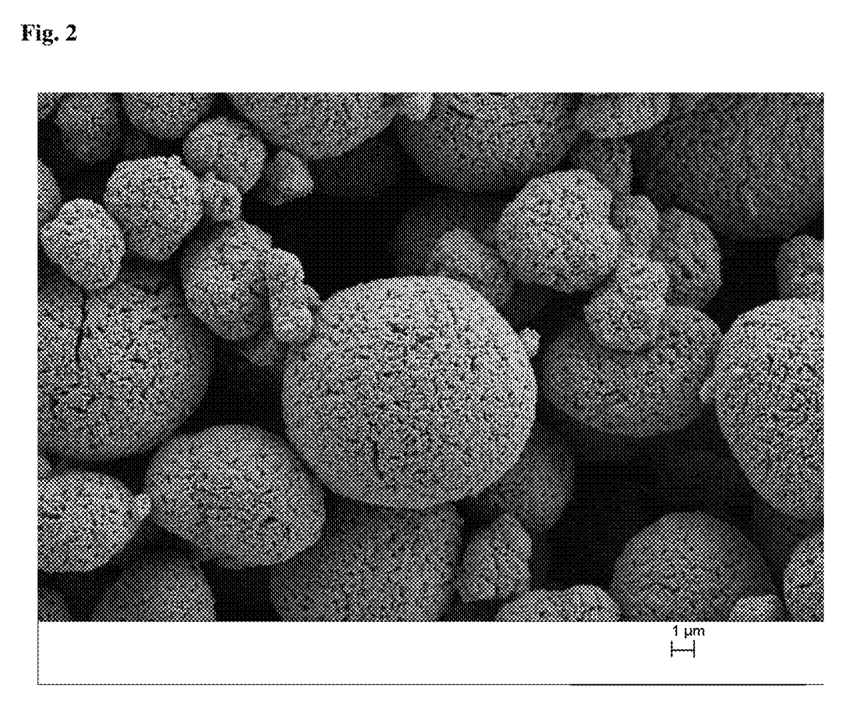
FIG. 2 shows an SEM image of the nickel electrode shown in FIG. 1 at a magnification of ten thousand times.
Figure 3:
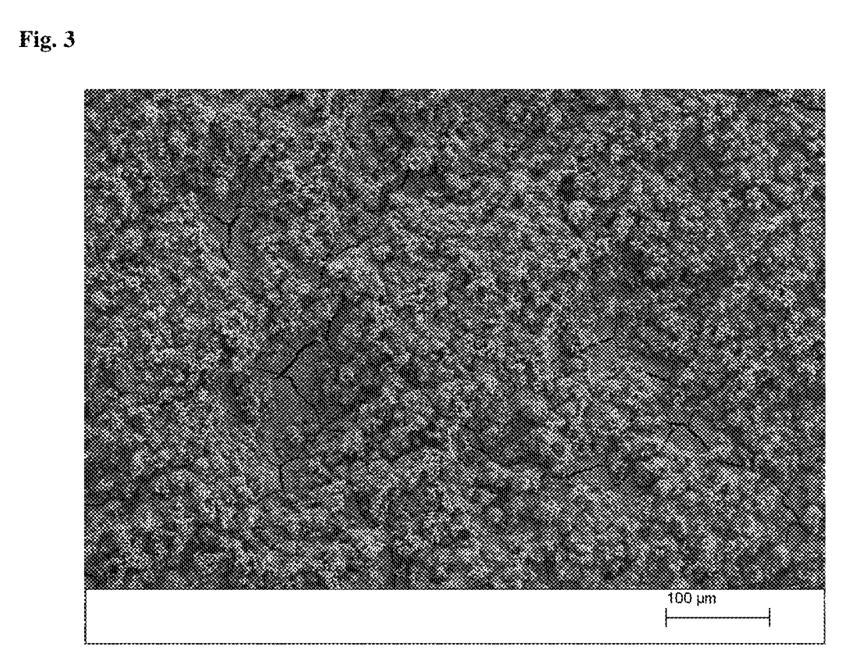
FIG. 3 shows an SEM image of the surface of a manganese dioxide electrode according to the invention having a 5 μm-thick manganese dioxide layer at a magnification of five hundred times.
Figure 4:
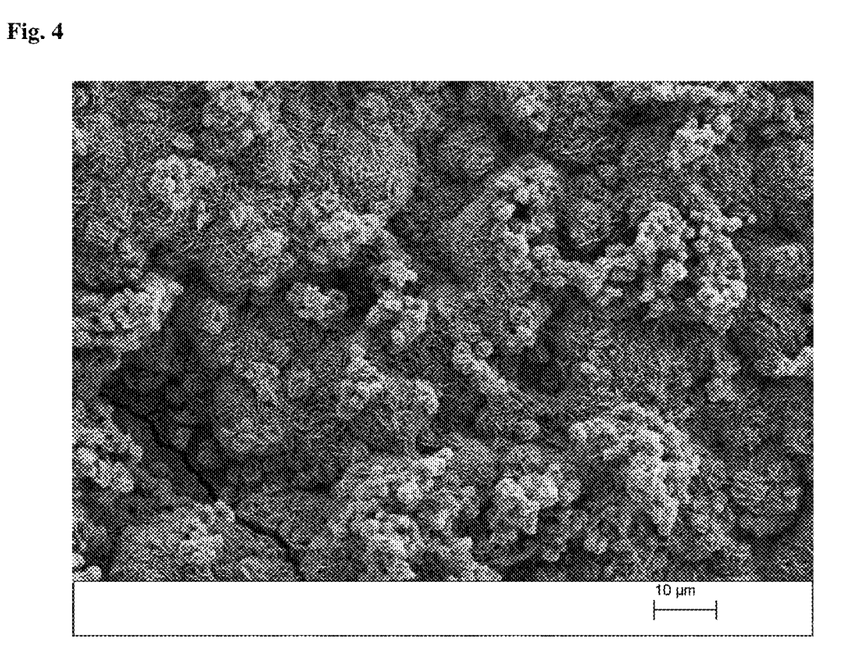
FIG. 4 shows an SEM image of the manganese dioxide electrode shown in FIG. 3 at a magnification of three thousand times.
Figure 5:
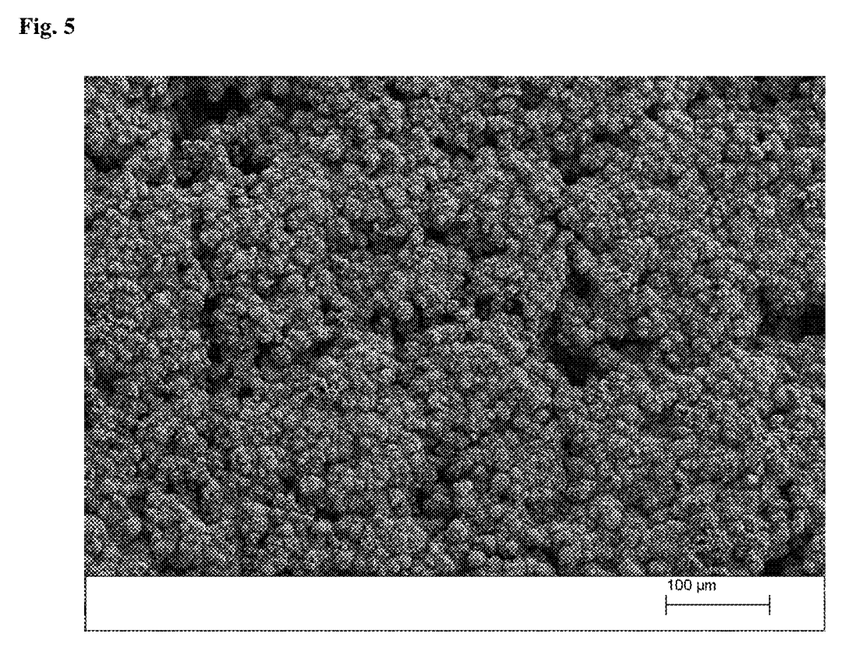
FIG. 5 shows a SEM image of the surface of a manganese dioxide electrode according to the invention having a 10 μm-thick manganese dioxide layer at a magnification of five hundred times.
Figure 6:
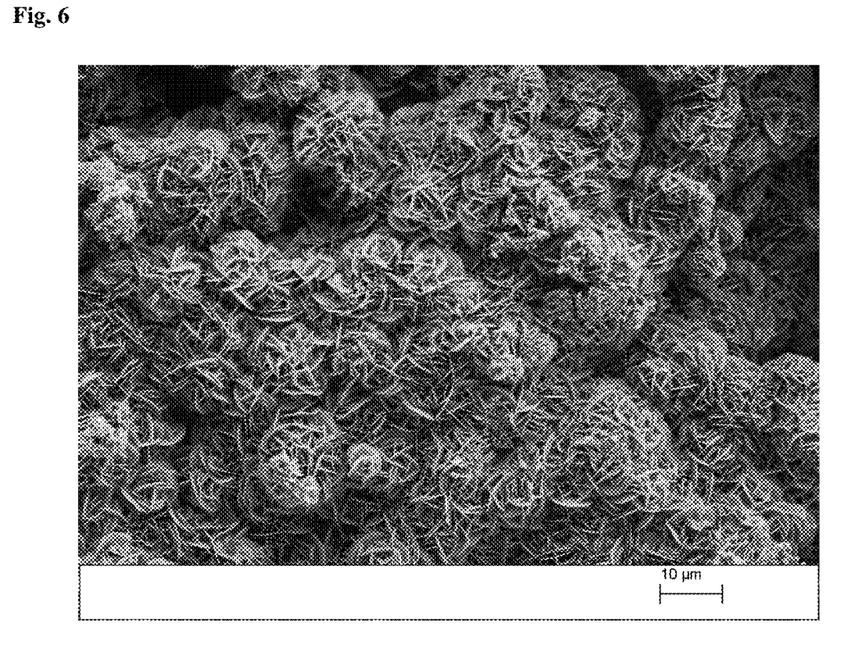
FIG. 6 shows an SEM image of the manganese dioxide electrode shown in FIG. 5 at a magnification of three thousand times.
Figure 7:
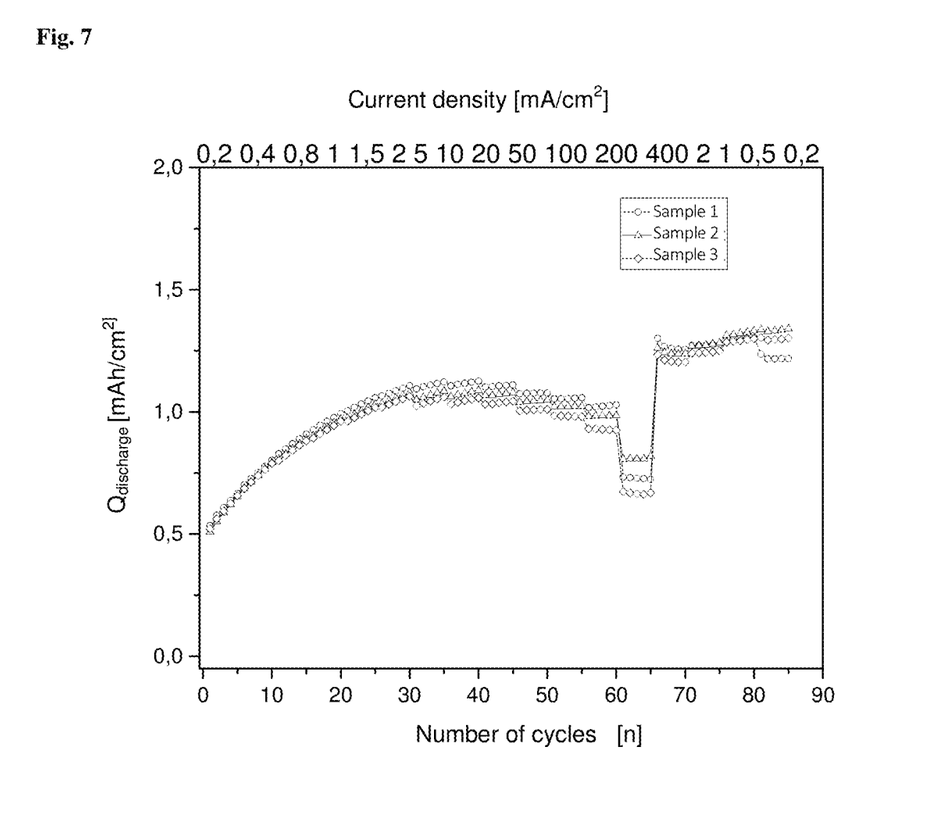
FIG. 7 shows discharge diagrams of manganese dioxide electrodes according to the invention having a manganese dioxide layer thickness of approximately 5 μm.

The $MnO_2$ electrodes with a coating thickness of 5 μm (example 1 and FIG. 7) have a maximum capacity of 1.27 mAh/cm² and can be discharged up to 200 mA/cm² or 157 C without significant loss of capacity (FIG. 7).

Figure 8:
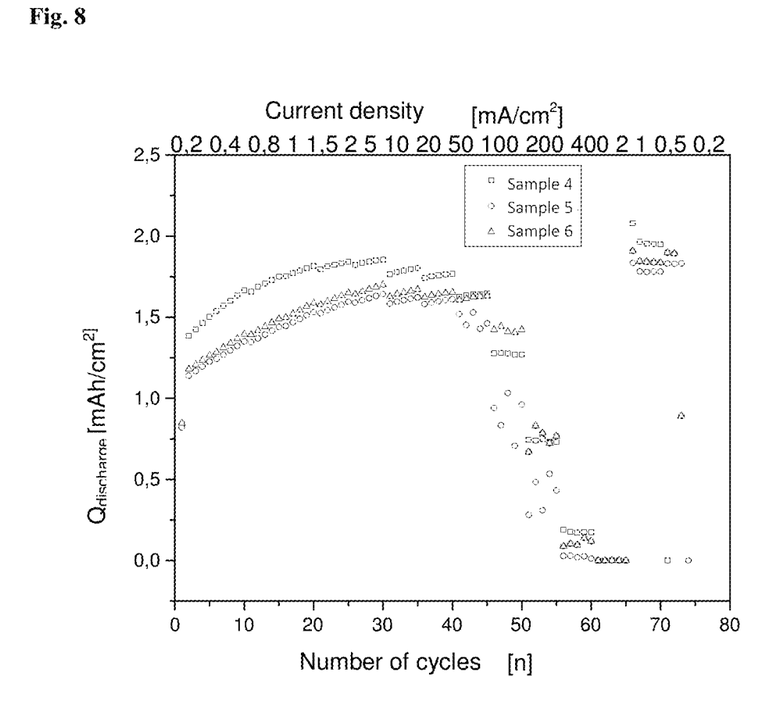
FIG. 8 shows discharge diagrams of manganese dioxide electrodes according to the invention having a manganese dioxide layer thickness of approximately 10 μm.

The $MnO_2$ electrodes with a coating thickness of 10 μm (example 2 and FIG. 8) have a maximum capacity of 1.92 mAh/cm² and can be discharged up to 50 mA/cm² or 26 C without significant loss of capacity (FIG. 8).

The fact that doubling the $MnO_2$ layer thickness does not lead to doubling the surface capacity is due to the fact that the nickel electrodes used as the base electrode structure already have their own capacity of approximately 0.55 mAh/cm². Taking this capacity of the nickel electrode into account results in a rounded capacity for the manganese dioxide layer of approximately 1.4 mAh per 10 μm layer thickness.

The discharges were each carried out on a 1 cm² electrode in 6.0 M KOH.

The invention claimed is:

1. A method for the production of a reversible manganese dioxide electrode, comprising the following steps:
    a) providing an electrode structure made of an electrically conductive carrier material having a nickel surface and a nickel layer made of spherical, porous nickel particles adhering to each other and having an inner pore structure, the nickel layer being applied to the electrically conductive carrier material;
    b) depositing a manganese(II)-hydroxide layer onto the spherical, porous nickel particles of the nickel layer from a manganese(II)-salt solution; and
    c) oxidizing the manganese(II)-hydroxide layer to a manganese dioxide layer, wherein the manganese dioxide layer is present in the inner pore structure of the nickel layer.

2. The method according to claim 1, wherein the deposition of a manganese(II)-hydroxide layer in step b) is carried out electrochemically.

3. The method according to claim 1, wherein in step b) a manganese nitrate solution is used as the manganese(II)-salt solution.

4. The method according to claim 1, wherein in step c) an oxidizing agent is used, selected from the group of hydrogen peroxide, potassium peroxodisulfate, potassium permanganate, sodium hypochlorite, dichloroxide, oxygen, and ozone.

5. The method of claim 4, wherein the oxidation in step c) is carried out by means of an alkaline solution of hydrogen peroxide.

6. The method of claim 5, wherein an aqueous solution of potassium hydroxide and hydrogen peroxide is used as the alkaline solution of hydrogen peroxide.

\* \* \* \* \*

UNITED STATES PATENT AND TRADEMARK OFFICE
CERTIFICATE OF CORRECTION

PATENT NO. : 11,133,500 B2
APPLICATION NO. : 16/770463
DATED : September 28, 2021
INVENTOR(S) : Ludwig Jörissen, Jerry Bamfo Asante and Olaf Böse

Page 1 of 1

It is certified that error appears in the above-identified patent and that said Letters Patent is hereby corrected as shown below:

On the Title Page

Item [71], delete the Applicant "ZENTRUM FÜR SONNENENERGIE- UND WASSERSTOFF-FORSCHUNG BADEN- WÜRTTEMBERG GEMEINNUTZIGE STIF-TUNG" and replace with "ZENTRUM FÜR SONNENENERGIE- UND WASSERSTOFF-FORSCHUNG BADEN-WÜRTTEMBERG GEMEINNÜTZIGE STIFTUNG"

Signed and Sealed this
Twenty-sixth Day of April, 2022

Katherine Kelly Vidal
*Director of the United States Patent and Trademark Office*